US008527665B2

(12) United States Patent
Stanciu et al.

(10) Patent No.: US 8,527,665 B2
(45) Date of Patent: Sep. 3, 2013

(54) REDIRECTING FUNCTION CALLS

(75) Inventors: Adrian Stanciu, Bucharest (RO);
Cosmin Rohat, Bucharest (RO)

(73) Assignee: Ixia, Calabasas, CA (US)

( * ) Notice: Subject to any disclaimer, the term of this patent is extended or adjusted under 35 U.S.C. 154(b) by 271 days.

(21) Appl. No.: 13/088,160

(22) Filed: Apr. 15, 2011

(65) Prior Publication Data
US 2012/0265866 A1 Oct. 18, 2012

(51) Int. Cl.
*G06F 15/16* (2006.01)
(52) U.S. Cl.
USPC .......................................... 709/250
(58) Field of Classification Search
USPC .......................................... 709/250
See application file for complete search history.

(56) References Cited

U.S. PATENT DOCUMENTS

| | | | |
|---|---|---|---|
| 6,678,734 B1 * | 1/2004 | Haatainen et al. | 709/230 |
| 7,159,222 B1 | 1/2007 | Forin et al. | |
| 7,543,309 B2 | 6/2009 | Forin et al. | |
| 7,565,665 B2 | 7/2009 | Forin et al. | |
| 7,797,616 B2 * | 9/2010 | Jensen et al. | 714/788 |
| 2005/0223018 A1 | 10/2005 | Forin et al. | |

OTHER PUBLICATIONS

Tool Interface Standards (TIS), Executable and Linkable Format (ELF), Portable Formats Specification, Version 1.1, Jan. 13, 2001, pp. 1-60.
Mulyadi Santosa, Understanding ELF using readelf and objdump, Linux Forms article, Jun. 16, 2006, pp. 1-6.
Evans et al., x86 Assembly Guide, article, Spring 2006, pp. 1-17.

* cited by examiner

*Primary Examiner* — Kevin Bates
(74) *Attorney, Agent, or Firm* — SoCal IP Law Group LLP; Mark A. Goldstein

(57) ABSTRACT

Redirecting a function included in an operating system is disclosed. The redirecting is achieved by identifying an original function call in a kernel and replacing the function call with a replacement function call so that the replacement function is called in place of the original function. In this way the original function call is bypassed and the original call is redirected to the replacement function. This may be done to augment or replace the original function. In one embodiment, when a packet is received, a replacement receiving function is called in place of the network receiving function that was provided with the kernel. In this way, different, less or additional processing of received packets may be performed.

6 Claims, 6 Drawing Sheets

© 2011 Ixia ured with supported protocols, and can withstand anticipated traffic demands. Such testing may also be performed on already deployed network devices, network segments and network applications.

REDIRECTING FUNCTION CALLS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to function calls and computer operating systems.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may also be used to evaluate how well a network device or network segment handles data communication, streaming media and voice communications.

Network testing systems may be implemented on off-the-shelf computer systems and workstations. Along with the typical component of a computer, to implement a network testing systems, the computer includes an operating system and a network card. Specialized network testing software may be installed on the computer to achieve the network testing system.

DETAILED DESCRIPTION

Apparatus

Figure 1:
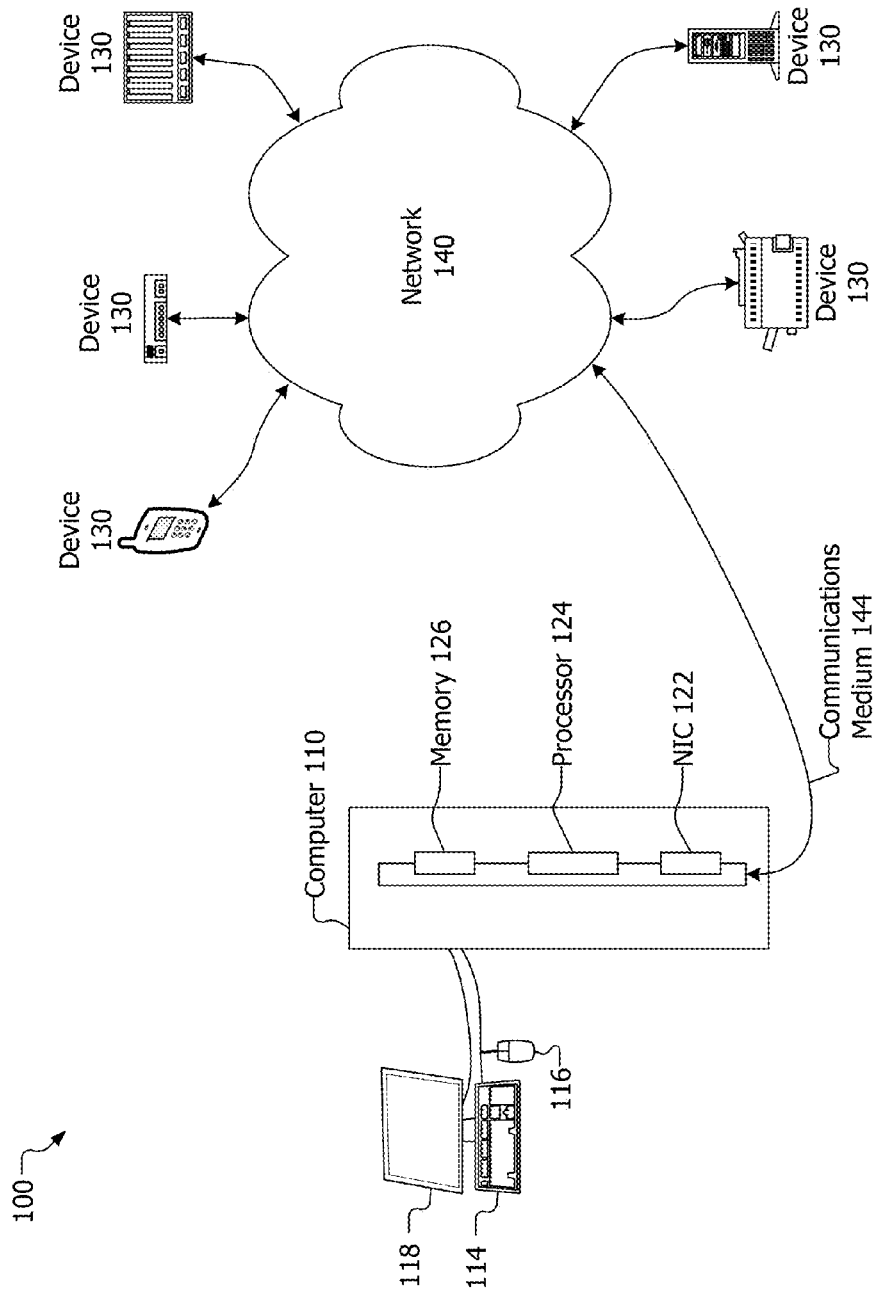
FIG. 1 is a block diagram of an environment in which a network testing system may be implemented.

FIG. 1 is a block diagram of an environment in which a network testing system may be implemented. The environment 100 shows a computer 110 in which may be configured as a network testing system having an augmented operating system. The environment 100 includes computer 110 coupled via at least one NIC 122 (described below) to a network 140 over a communications medium 144. The computer 110 may include network testing software that allows it to function as or be one or more of a performance analyzer, a conformance validation system, a network analyzer, a packet blaster, a network management system, a combination of these, and/or others. The network testing software transforms the general purpose computer into a specialized computer.

The computer 110 may be used to evaluate or measure characteristics and performance of a network communication medium, a network application, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software.

The computer 110 may be in the form of a higher end desktop or notebook computer. The computer 110 may include one or more NICs 122. The NIC 122 may be permanently installed in the computer 110, may be removable, or may be a combination thereof. The term NIC 122 as used herein encompasses network interface cards, a network interface chips and network interface chipsets which may be included on a motherboard or an add-on card included in the computer 110. The term network interface card may include data interface cards, packet engine cards, service cards, smart cards, switch cards, relay access cards, CPU cards, port cards, and others. The NIC 122 may function as two or more network devices when the NIC includes the needed hardware components to achieve this.

The NIC 122 may be implemented as one or more field programmable gate arrays (FPGA), application specific integrated circuits (ASIC), programmable logic devices (PLD), programmable logic arrays (PLA), other kinds of devices, and combinations of these. The NIC 122 may support one or more communications protocols. The NIC 122 may include a network interface through which the computer 110 and the software included therein may transmit and/or receive communications over the network 140.

The NIC 122 may include and/or have access to local and/or remote memory, storage media and storage devices.

NIC 122 is coupled with network 140 via a communications medium 144. Although a single connection over communications medium 144 is shown, if multiple NICs 122 are included, each of the NICs 122 may be connected with network 140 over a communications medium. The communications medium 144 may be, for example, wire lines such as an Ethernet cable, fibre optic cable, and coaxial cable, and may be wireless.

The computer 110 includes an operating system such as, for example, versions of Linux, Unix and Microsoft Windows. In one implementation, RED HAT® Enterprise Linux 5.3 available from Red Hat, Inc. of Raleigh, N.C. may be used.

The computer 110, the operating system included therein and the NIC 122 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. The network stack included in or part of the operating system kernel may provide support for some or all of the communications protocols.

Instructions to be executed by the processor 124 may be stored on and executed from a local or remote machine readable medium or storage device. A machine readable medium includes, for example, without limitation, magnetic media (e.g., hard disks, tape, floppy disks), optical media (e.g., CD, DVD, BLU-RAY DISC®), flash memory products (e.g., MEMORY STICK®, COMPACTFLASH® and other flash memory media), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium and may include a machine readable medium. Storage devices include hard disk drives, magnetic tape, solid-state drives (SSDs), DVD drives, BLU-RAY DISC® drives, flash memory devices, and others.

The computer 110 may have coupled therewith a display 118 and user input devices such as a keyboard 114 and a mouse 116, as well as other user input devices including, for example, pens and trackballs. The user input devices may be coupled to a motherboard included in the computer 110. The display may be coupled to a graphics card or the motherboard included in the computer 110.

Additional and fewer units, hardware and firmware may be included in the computer 110.

The computer 110 may be used alone or in conjunction with one or more other network testing systems 111. The computer 110 may be located physically adjacent to and/or remote to the network devices 130 in the network 140. The computer 110 may be used to test and evaluate the network 140 and/or portions thereof, network devices 130, applications running on network devices 130, and/or services provided by network 140 and/or network devices 130 and/or network applications.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for packets to travel. Each node may be a network device as described herein. A node may be a computing device, a data communications device, a network device, a network card, or other devices as defined and described herein.

Communications on the network 140 may take various forms, including frames, cells, datagrams, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others.

The network devices 130 may be devices capable of communicating over the network 140 and/or listening to, injecting, delaying, dropping, relaying, processing, and/or modifying network traffic on network 140. The network devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network devices 130 may include vehicles such as cars and trucks, home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network devices 130 may be devices to be tested and may be referred to as devices or systems under test.

The computer 110 may send communications over the network 140 to or through a network device 130. Network testing software included in the computer 110 may be used to send various network communications. The destination of communications sent by the computer 110 may be a device under test such as a network device 130, may be the computer 110 such as a test between two network cards in the same computer 110, and may be a second network testing system 111. The network testing system 111 may be similar to or the same as computer 110 or may be a specialized network testing device. The computer 110 may send communications over the network 140 to or through a network device 130 that are received by the computer 110 or are received by the network testing system 111. The computer 110 may send communications over the network 140 to network testing system 111, and the computer 110 may receive communications over the network 140 from the network testing system 111. The computer 110 may send communications over the network 140 and optionally through a network device 130 to back to itself. The computer 110 may listen to and capture communications on the network 140.

The network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols. The network testing software may be stored on a volatile or nonvolatile memory device or storage medium included in or on and/or coupled with the computer 110.

Network tests run on computer 110 may test the functionality and features of network devices 130 coupled with network 140 and of applications or other software running on servers or network devices 130 coupled with network 140. In one embodiment, when testing the functionality and features of devices coupled with network 140, computer 110 may transmit packets to a network device 130 (commonly referred to as a device under test or DUT) coupled with the network 140. In an another embodiment the computer 110 may transmit packets to a network device 130 (or DUT) coupled with the network 140 and directed to, for example, network testing system 111.

The computer 110 may include and run operating system software that supports virtualization. The virtualization software or virtual machine software may run concurrently with an existing operating system or may be the operating system provided on computer 110. In one embodiment, the virtualization software may be the ESX product available from VMware, Inc. of Palo Alto, Calif. that provides a hypervisor or virtual machine monitor.

Figure 2:
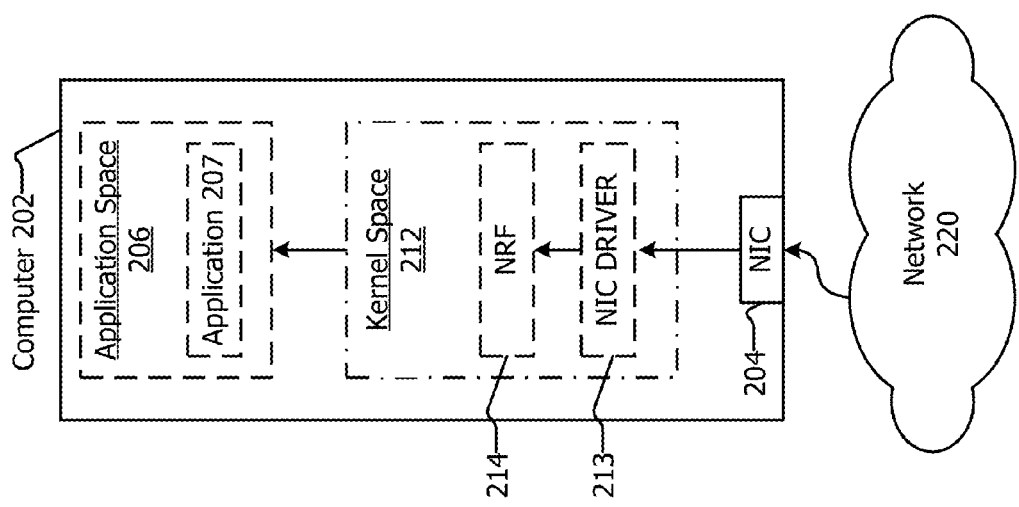
FIG. 2 is a block diagram showing selected software and components of a network enabled computer.

FIG. 2 is a block diagram showing selected software and components of a network enabled computer. Computer 202 is similar to or the same as computer 110 shown in FIG. 1. Computer 202 is coupled with network 220. That computer 202 is network enabled means that computer 202 is capable of sending and receiving packets over network 220 via NIC 204. The memory in the computer may be virtually partitioned into application space 206 and kernel space 212. Application programs 207 execute in application space 206, and the operating system including the operating system and kernel modules and drivers that are part of the operating system operate in kernel space 212. Packets or other communications received by NIC 204 from network 220 are passed to a network receiving function (NRF) 214 in operating system kernel 212 by NIC driver 213 in the kernel. The operating system makes the packets available to an application 207.

When network testing system software or other specialized application software 207 is implemented on a computer 202, the operating system may be an off-the-shelf or precompiled kernel that is not readily modifiable or otherwise configurable and may include unmodifiable precompiled and preconfigured kernel modules. To implement certain features and functionality in the network testing software that serves as an application 207 on the computer 202, it may be preferred to bypass or otherwise change the processing that is performed by the network receiving function 214 included in or with the kernel of the operating system. It may be preferred to bypass or otherwise change the processing that is performed by the network receiving function 214 included in or with the kernel 212 because different, less or additional processing of received packets received from NIC 204 over network 220 may be needed by the application 207. To achieve the different, less or additional processing of received packets, when packets are received, the packets are redirected to a replacement receiving function instead of the network receiving function. Stated another way, the network receiving function is bypassed and the replacement receiving function is called in its place. Stated yet another way, incoming packets are redirected from the network receiving function to a replacement receiving function that is called in its place. In this way, the operating system is augmented to perform differently than as provided in its compiled object form or its delivered arrangement or configuration.

Figure 3:
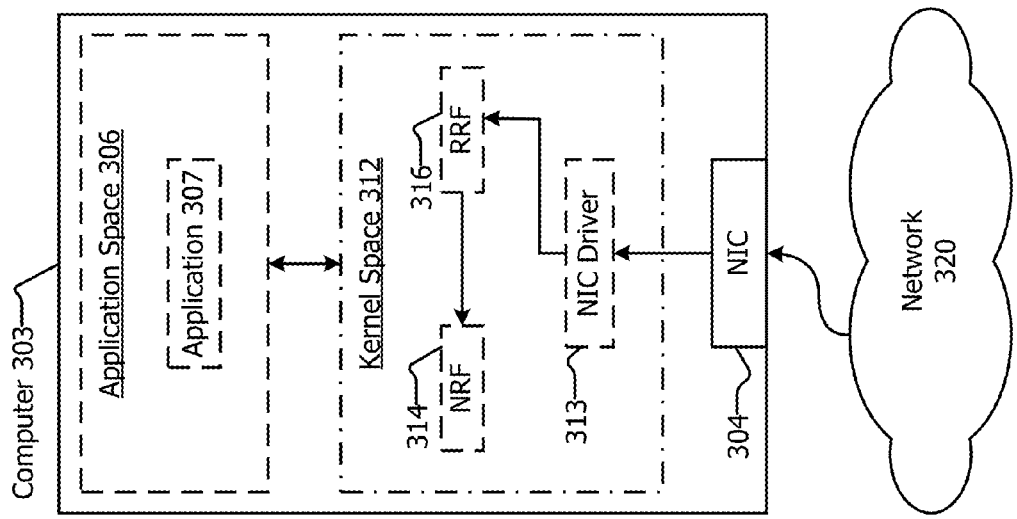
FIG. 3 is a block diagram of showing selected software and components of a network enabled computer with an augmented operating system kernel.

FIG. 3 is a block diagram of showing selected software and components of a network enabled computer with an augmented operating system kernel. The memory in the computer may be virtually partitioned into application space 306 and kernel space 312. Application programs 307 execute in application space 306, and the operating system including the operating system and kernel modules and drivers that are part of the operating system operate in kernel space 312. When computer 303 receives packets from network 320 via NIC 304, the packets are sent to a replacement receiving function (RRF) 316 instead of the network receiving function (NRF) 314 included with kernel 312 by NIC driver 313 included with the kernel. That is, the network receiving function 314 is bypassed and the replacement receiving function 316 is called in its place by the NIC driver 313 that is part of the kernel. Stated another way, packets are redirected from the network receiving function 314 to a replacement receiving function 316 that is called in place of the network receiving function 314. The RRF 316 may provide different, less or additional processing of received packets when compared to the original network receiving function included with the kernel. The replacement receiving function 316 may provide packets directly to the kernel or the application 307, or may call the network receiving function 314 (as shown) after performing certain actions or processing on or triggered by the received packets. In this way, the operating system kernel, though precompiled and unmodifiable, is augmented to provide desired functionality to the application 307.

Methods

Figure 4:
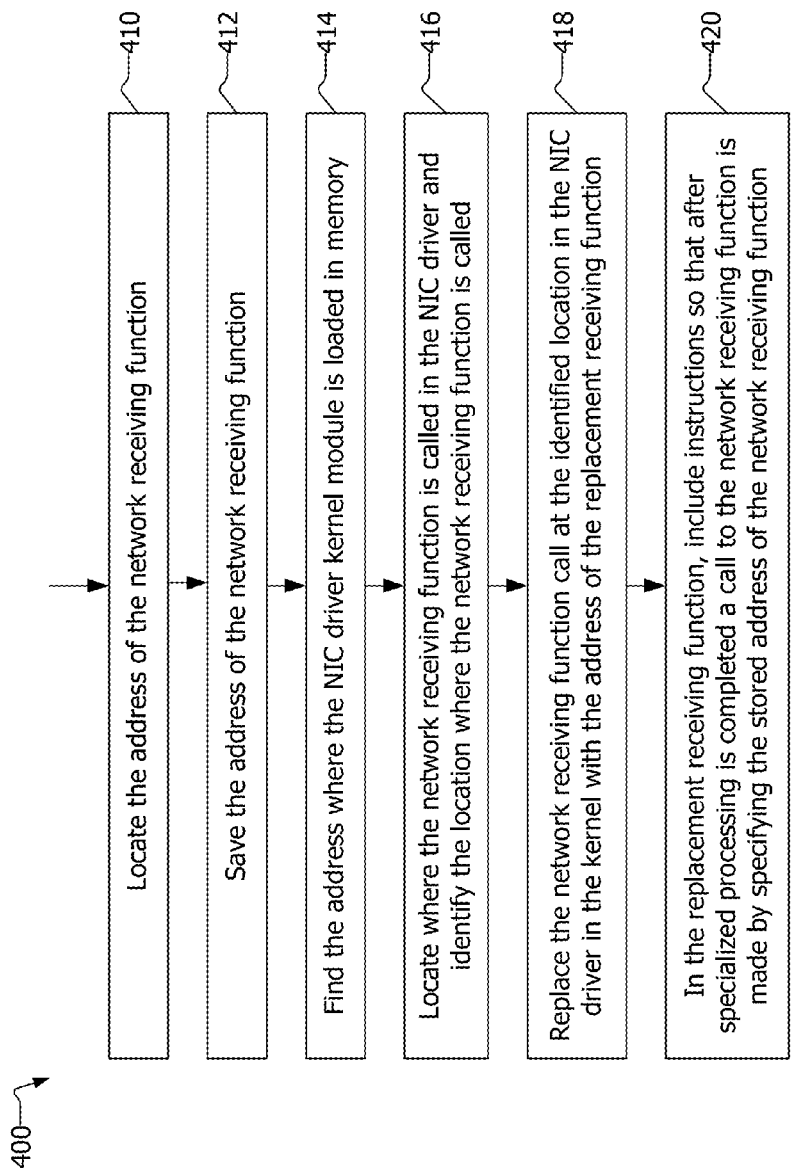
FIG. 4 is a flow chart of actions taken to augment an operating system kernel with a replacement receiving function in place of a network receiving function.

FIG. 4 is a flow chart 400 of actions taken to augment an operating system kernel with a replacement receiving function in place of a network receiving function. A computer having an operating system may be augmented to bypass or replace a function included in the kernel. The method provided herein is described generally, and a specific implementation is also detailed. The address of the network receiving function is located, as shown in block 410. This may be achieved by searching the symbol table and/or the relocation table associated with the NIC driver (included with the kernel and shown as 313 in FIG. 3) for the text name of the network receiving function. For example, a search for the text netdriver (a generic term) and, more specifically in one implementation, the text netif_receive_skb may be performed on table files of the NIC drivers provided with the operating system. In one implementation, the symbol tables of the vmxnet3 or ixgbe drivers may be searched. The symbol table(s)

may be obtained using objdump. The search may be performed using grep or other text search program. The symbol table, the relocation table and/or another table may provide a list of functions, the base address in memory where the NIC driver kernel module is loaded, and the offset in the kernel where the function is located. The base address and offset may be combined to determine the address of the network receiving function. Referring back to FIG. 3, when a packet is received, the NIC driver 313 operating in kernel space 312 typically calls the network receiving function 314 by specifying the address of the network receiving function made available to it through the table files associated with the operating system kernel. Referring again to FIG. 4, the address of the network receiving function is saved, as shown in block 412. The address where the NIC driver kernel module is loaded in memory is found, which may be referred to as the base address, as shown in block 414. Where the network receiving function is called is located, and the location within the kernel space where the network receiving function is called is identified, as shown in block 416.

Figure 5:
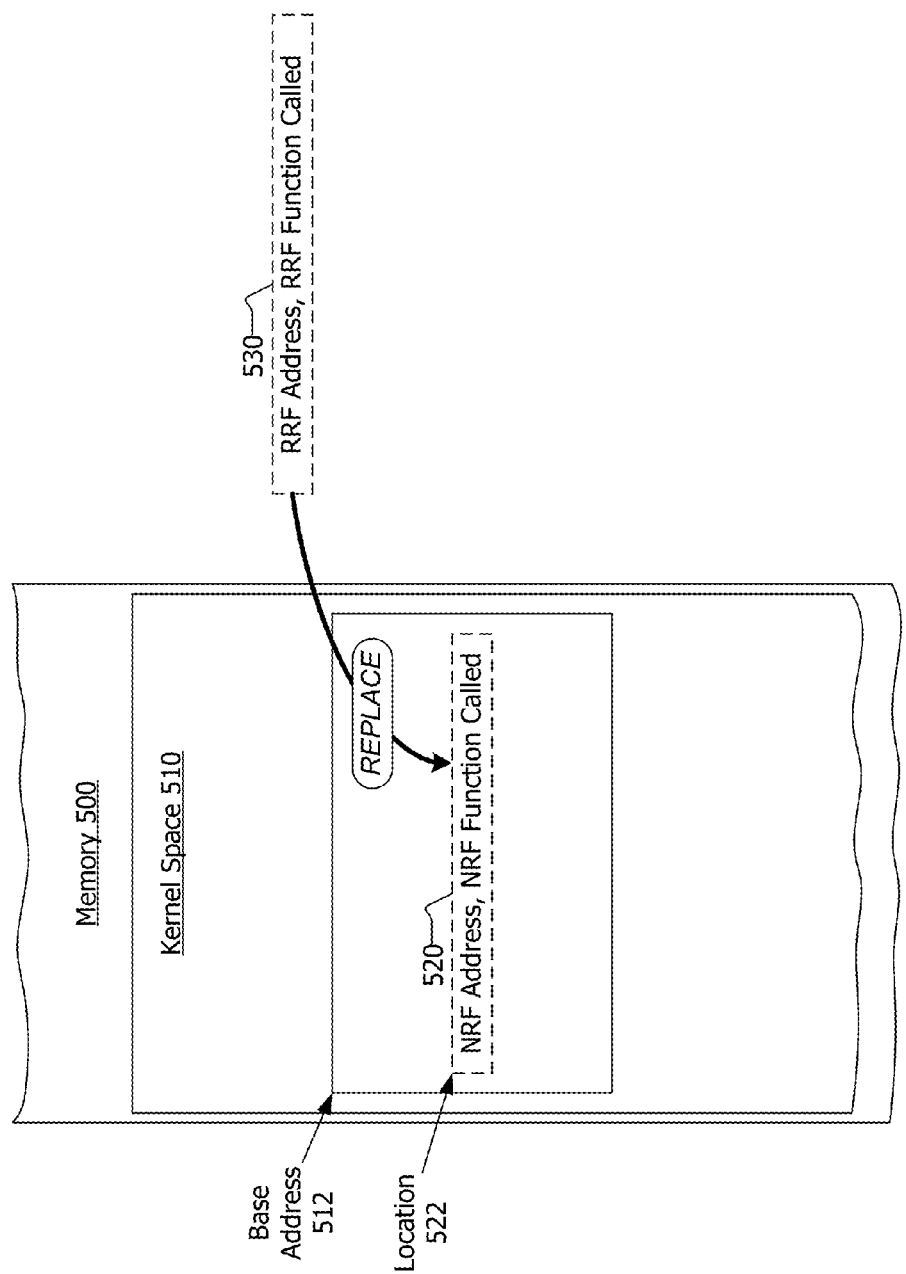
FIG. 5 is a block diagram showing an operating system kernel in memory, a network receiving function and a replacement receiving function.

It is helpful to refer to FIG. 5 which shows a block diagram of operating system kernel space 510 in memory 500, a pointer to the network receiving function 520 at location 522 and a pointer to the replacement receiving function 530. It is the base address 512 of the NIC driver kernel module that is found by performing the action described in block 414. The symbol and/or relation tables of the NIC driver is/are searched to locate an offset where the network receiving function is called, including searching for the address of the network receiving function and identifying the location 522 or offset where the network receiving function 520 is called. The searching of symbol, relocation and/or other tables may be performed using grep or other search tool. The identified location 522 is the base address 512 where the NIC driver is loaded plus an offset found when searching the symbol and/or relation tables.

The network receiving function call 520 at the identified location 522 in the kernel is replaced in memory with the memory address of the replacement receiving function 530, as shown in block 418. In one embodiment, in the replacement receiving function, instructions are included so that after specialized processing is completed a call to the network receiving function is made by specifying the stored address of the network receiving function, as shown in block 420. In other embodiments, the replacement receiving function may take no further action regarding the packet or may pass the received packet directly to an application such as a network testing software application.

Figure 6:
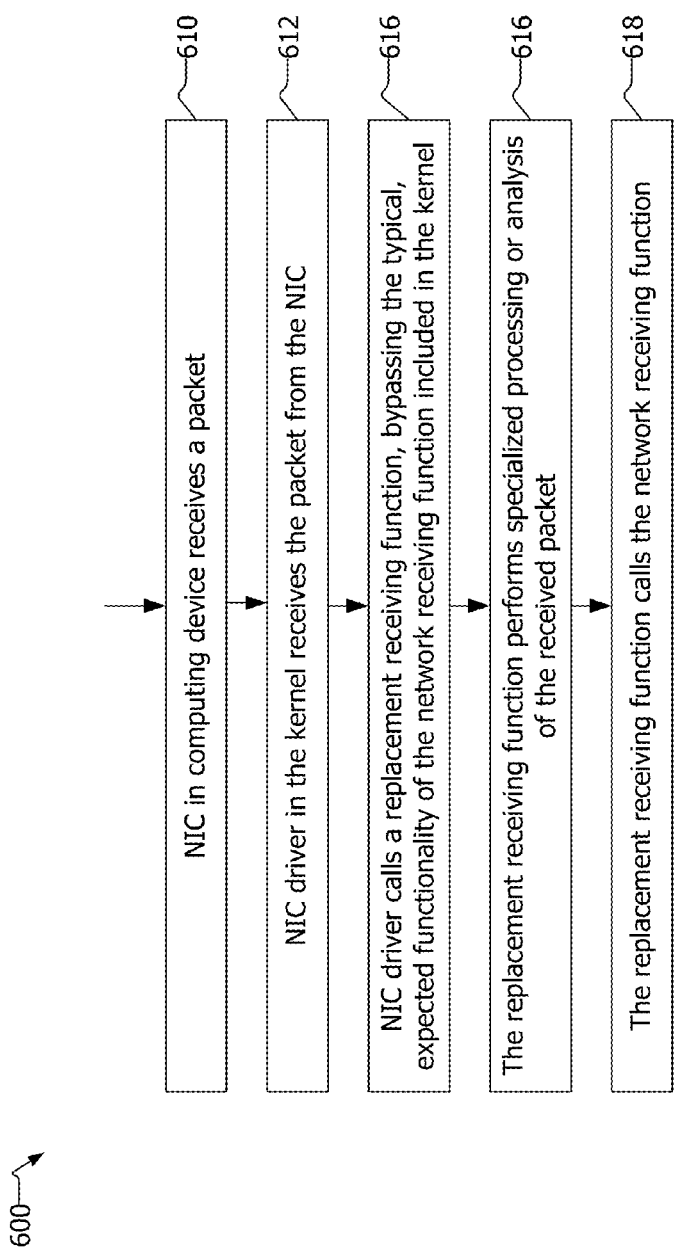
FIG. 6 is a flow chart of actions taken when receiving a packet in computer having an augmented operating system kernel.

FIG. 6 is a flow chart 600 of actions taken when receiving a packet in computer having an augmented operating system kernel. A NIC in a computing device receives a packet, as shown in block 610. The NIC driver, which is part of the kernel, in the computing device receives the packet, as shown in block 612. The NIC driver, which is part of the kernel, calls a replacement receiving function, bypassing the typical, expected functionality of the network receiving function that was originally included in the kernel, as shown in block 614. The replacement receiving function may perform specialized processing or analysis of the received packet, as shown in block 616. In one embodiment, the replacement receiving function calls the originally provided network receiving function, as shown in block 618. In other embodiments, the replacement receiving function may take no further action regarding the packet or may pass the received packet directly to an application such as a network testing software application.

As set forth herein, a pre-compiled object code version of an operating system may be augmented so that additional, different, more or less processing is performed when a packet is received over a network. This may be viewed as a function bypass or function redirection technique. As described above, the originally provided kernel function is bypassed and replaced with a replacement function to achieve a particular goal.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computing device including a processor, a memory, an operating system kernel and a network communications unit, the computing device coupled with a network, the computing device having instructions stored thereon which when executed cause the computing device to perform operations comprising:

locating in a kernel space in the memory an address of a network receiving function by searching a symbol table and/or a relocation table of the network receiving function in the kernel space in the memory for a text name of the network receiving function;

saving the address of the network receiving function;

finding an address in the kernel space in the memory where a network communications unit driver kernel module is loaded;

identifying a location in the operating system kernel where a network receiving function call is made, including locating in the network communications unit driver kernel module in the kernel space in the memory where the network receiving function call is made by looking for a match of the network receiving function address;

replacing the network receiving function call in the operating system kernel with a replacement receiving function call, including replacing in the network communications unit driver kernel module in the kernel space in the memory the network receiving function call with the replacement receiving function call;

the network communications unit receiving a packet;

the operating system kernel receiving the packet from the network communications unit;

the operating system kernel calling the replacement receiving function instead of a network receiving function that was provided with the operating system kernel.

2. The computing device of claim 1 having further instructions stored thereon which when executed cause the computing device to perform operations further comprising:

the replacement receiving function calling the network receiving function that was provided with the operating system kernel.

3. The computing device of claim 1 wherein the operating system kernel receiving the packet from the network communications unit is achieved by the network communications unit driver kernel module;

the operating system kernel calling the replacement receiving function is achieved by the network communications unit driver kernel module.

4. The computing device of claim 1 wherein the replacement receiving function executes in the kernel space in the memory.

5. A method comprising:

locating in a kernel space in a memory an address of a network receiving function by searching a symbol table and/or a relocation table of the network receiving function in the kernel space in the memory for a text name of the network receiving function;

saving the address of the network receiving function;

finding an address in the kernel space in the memory where a network communications unit driver kernel module is loaded;

identifying a location in the kernel space in the memory where the network receiving function call is made, including locating in the network communications unit driver kernel module in the kernel space in the memory where the network receiving function call is made by looking for a match of the network receiving function address;

replacing the network receiving function call in the kernel space in the memory with a replacement receiving function call so that the replacement receiving function is called in place of the network receiving function call, including replacing in the network communications unit driver kernel module in the kernel space in the memory the network receiving function call with the replacement receiving function call.

6. The method of claim 5 wherein the replacement receiving function includes a call to the network receiving function.

* * * * *